United States Patent
Jeon et al.

(10) Patent No.: US 12,490,394 B2
(45) Date of Patent: Dec. 2, 2025

(54) DISPLAY DEVICE

(71) Applicant: LG ELECTRONICS INC., Seoul (KR)

(72) Inventors: Yonggu Jeon, Seoul (KR); Gihoon Tho, Seoul (KR); Wonsuk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/576,524

(22) PCT Filed: Dec. 15, 2022

(86) PCT No.: PCT/KR2022/020401
§ 371 (c)(1),
(2) Date: Jan. 4, 2024

(87) PCT Pub. No.: WO2024/048861
PCT Pub. Date: Mar. 7, 2024

(65) Prior Publication Data
US 2025/0098084 A1 Mar. 20, 2025

(30) Foreign Application Priority Data
Sep. 2, 2022 (KR) .................. 10-2022-0111706

(51) Int. Cl.
*H05K 5/02* (2006.01)
*B60K 35/22* (2024.01)
*B60K 35/53* (2024.01)

(52) U.S. Cl.
CPC .......... *H05K 5/0221* (2013.01); *B60K 35/22* (2024.01); *B60K 35/53* (2024.01)

(58) Field of Classification Search
CPC ...... H05K 5/0221; B60K 35/22; B60K 35/53; B60K 2360/172; B60K 2360/175;
(Continued)

(56) References Cited

U.S. PATENT DOCUMENTS

| 8,649,161 B2* | 2/2014 | Kato ................. B60K 35/28 345/905 |
| 8,953,247 B2* | 2/2015 | Rumpf ............... G02B 27/0149 359/632 |

(Continued)

FOREIGN PATENT DOCUMENTS

| EP | 1036692 | 9/2000 |
| FR | 2896192 | 7/2007 |

(Continued)

OTHER PUBLICATIONS

PCT International Application No. PCT/KR2022/020401, International Search Report dated Apr. 27, 2023, 10 pages.

(Continued)

*Primary Examiner* — Pegeman Karimi
(74) *Attorney, Agent, or Firm* — LEE, HONG, DEGERMAN, KANG & WAIMEY

(57) ABSTRACT

A display device according to the present embodiment may comprise: a display module having a hidden area covered by a cover installed on a vehicle and an exposed area above the hidden area; and a guide mechanism connected to the display module and configured to guide movement of the display module in an inclined direction.

9 Claims, 10 Drawing Sheets

(58) Field of Classification Search
CPC .. B60K 2360/816; B60K 35/60; G09G 5/391; G09G 2340/04; G09G 5/373; G09G 2380/10; G06F 3/1454; B60R 11/0229; B60R 2011/0085; B60R 2011/0092; B60Y 2400/92

See application file for complete search history.

(56) References Cited

U.S. PATENT DOCUMENTS

| | | | |
|---|---|---|---|
| 2006/0108900 A1* | 5/2006 | Lee | B60R 11/0235 361/679.21 |
| 2008/0083293 A1* | 4/2008 | Sawai | F16M 11/10 74/412 TA |
| 2013/0026889 A1 | 1/2013 | Lee et al. | |
| 2017/0315354 A1 | 11/2017 | Park et al. | |
| 2018/0201204 A1* | 7/2018 | Saitou | B60R 11/0229 |

FOREIGN PATENT DOCUMENTS

| | | |
|---|---|---|
| KR | 100510411 | 8/2005 |
| KR | 1020050092267 | 9/2005 |
| KR | 1020060057498 | 5/2006 |
| KR | 101887078 | 9/2018 |
| WO | 2017014132 | 1/2017 |

OTHER PUBLICATIONS

European Patent Office Application Serial No. 22953363.3, Search Report dated Dec. 16, 2024, 8 pages.

* cited by examiner

[FIG. 1]
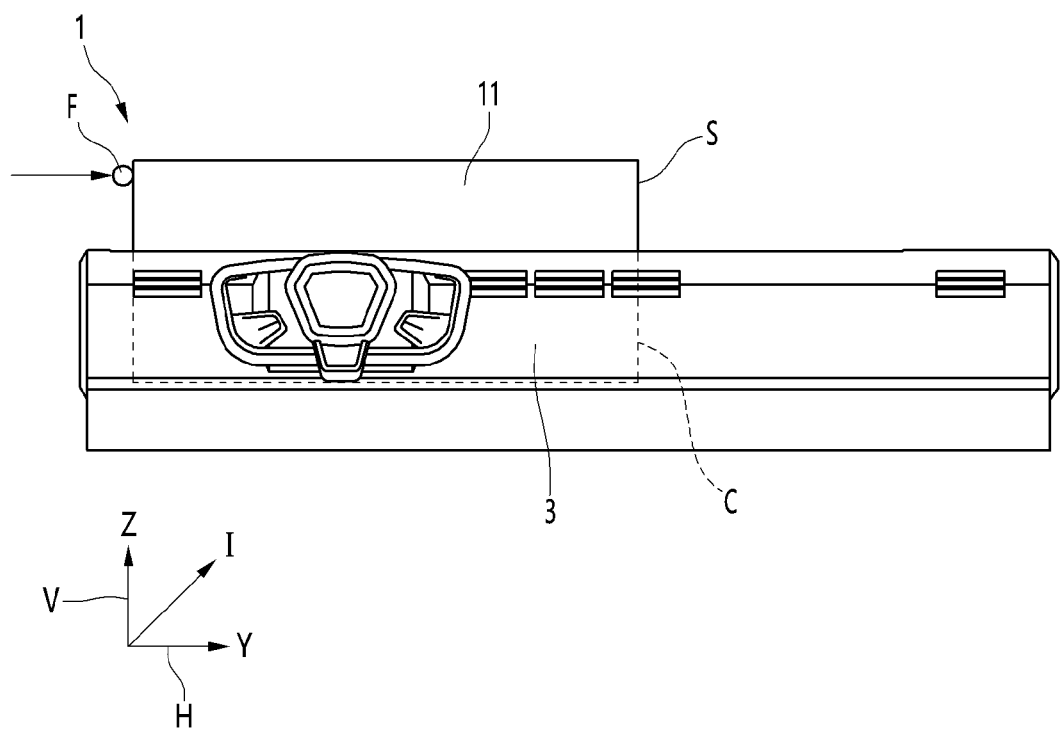

[FIG. 2]
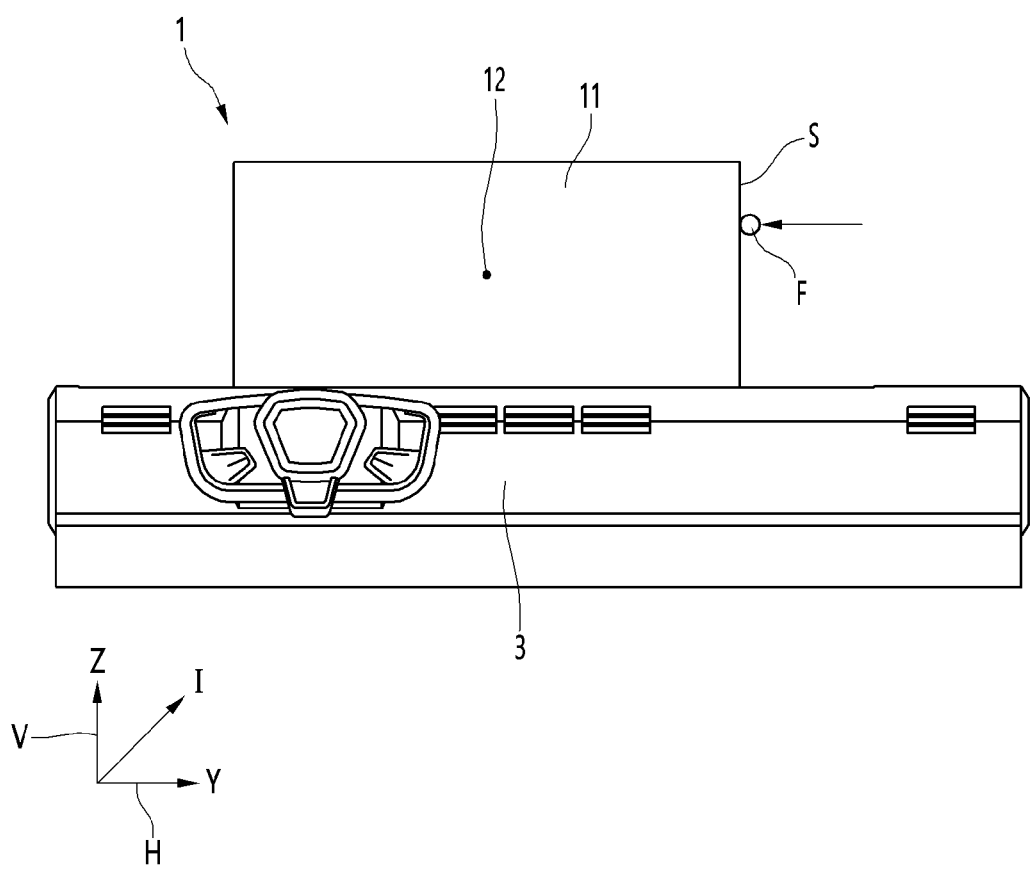

[FIG. 3]
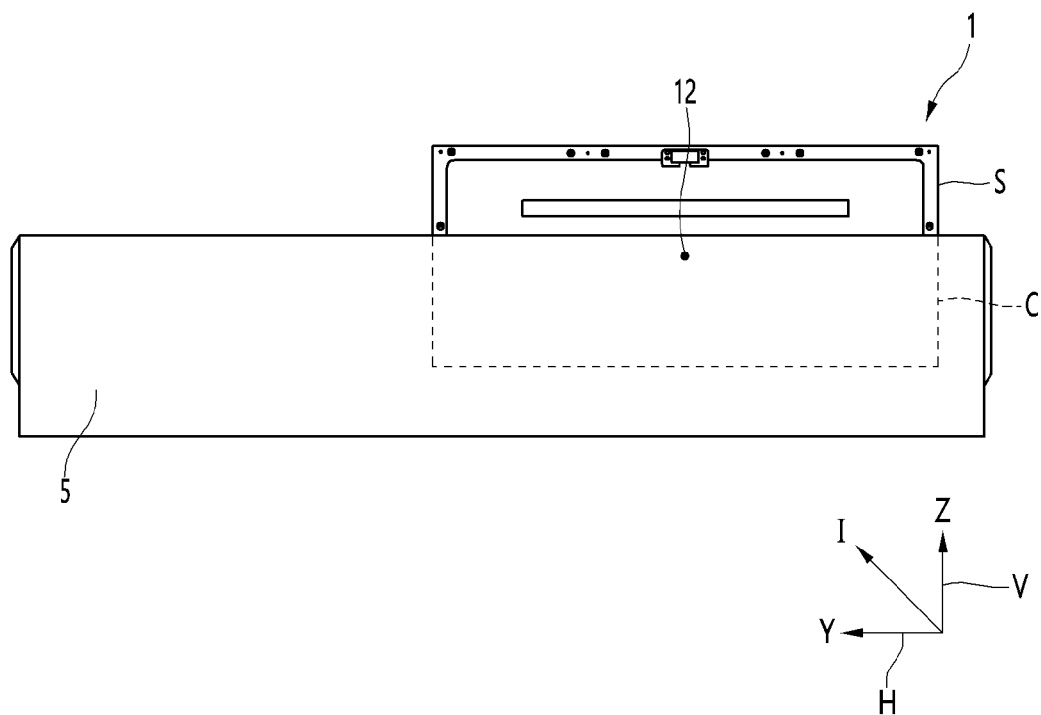

[FIG. 4]
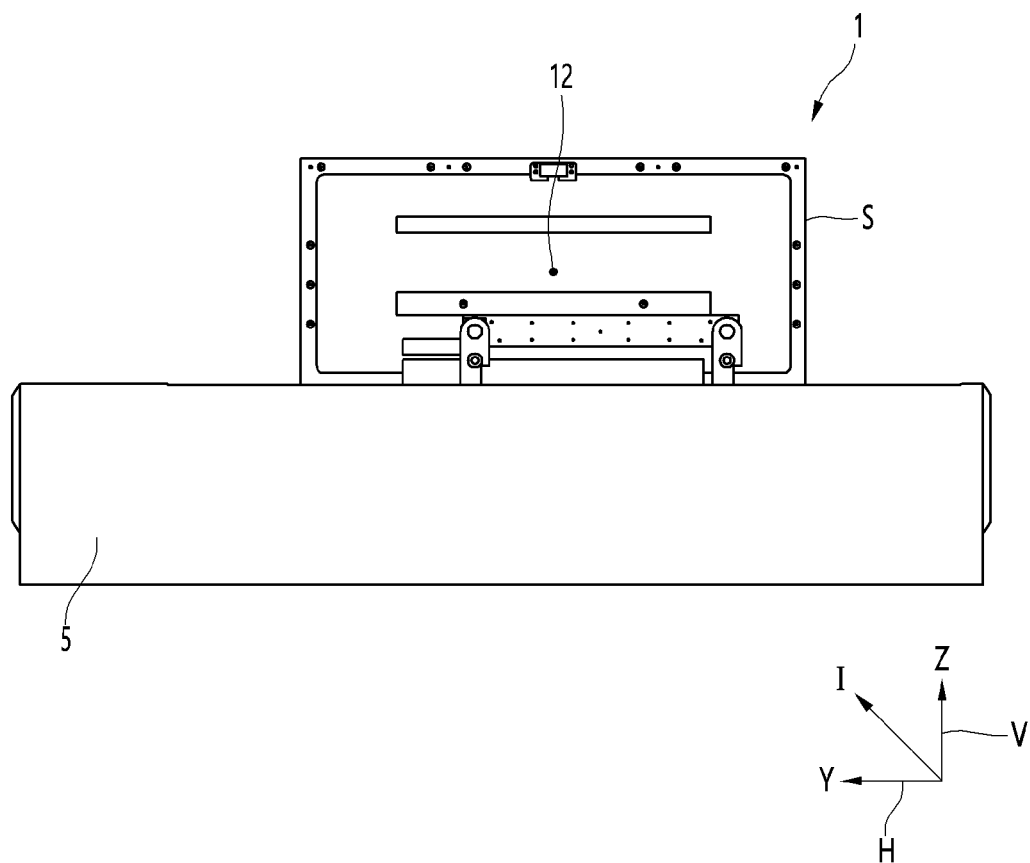

[FIG. 5]
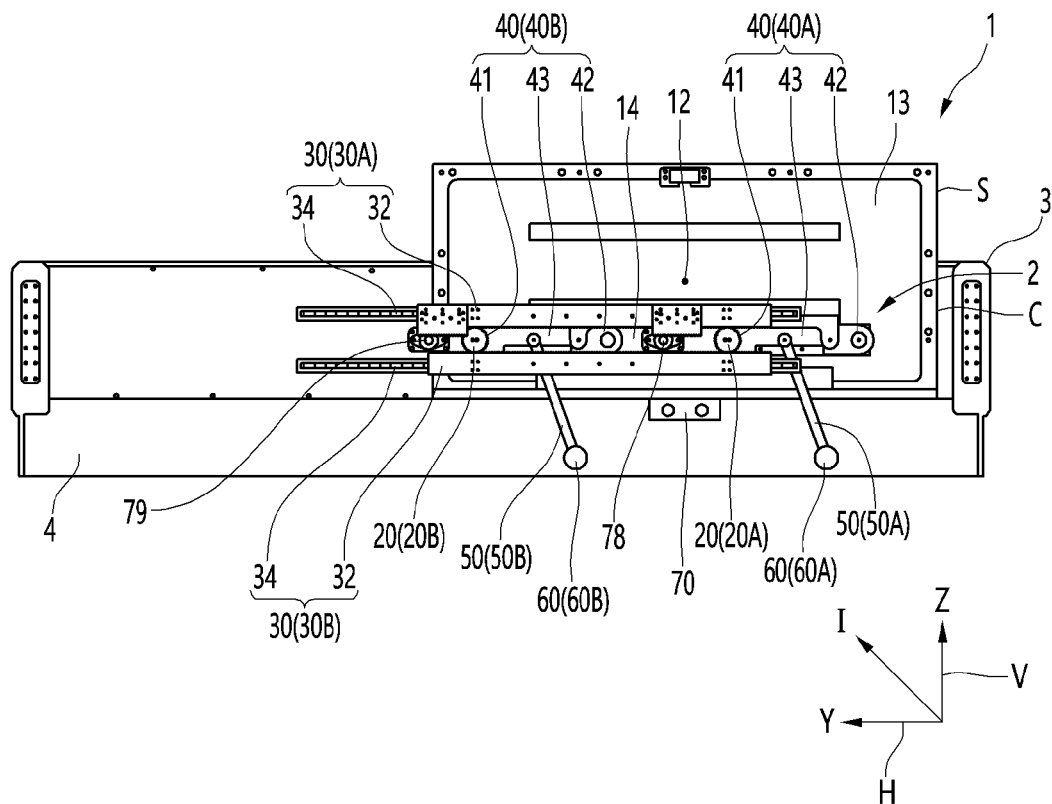

[FIG. 6]
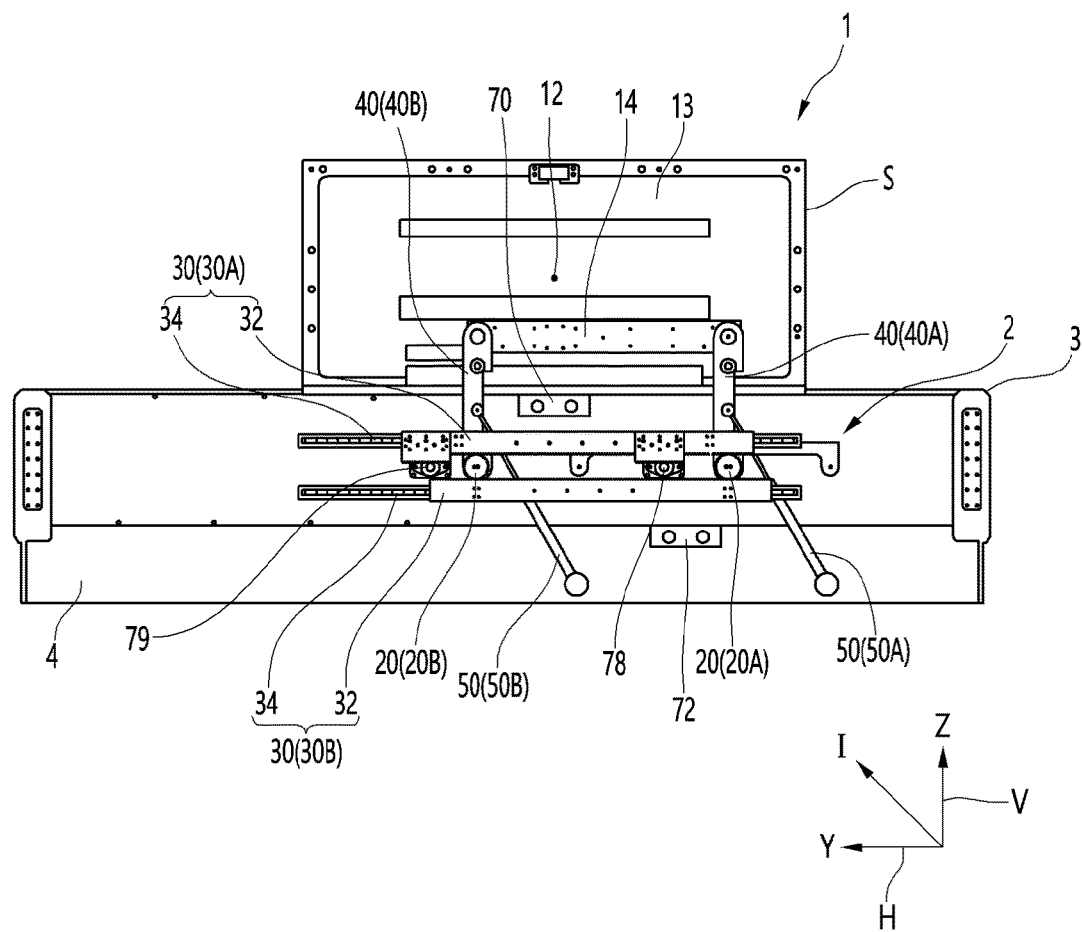

[FIG. 7]
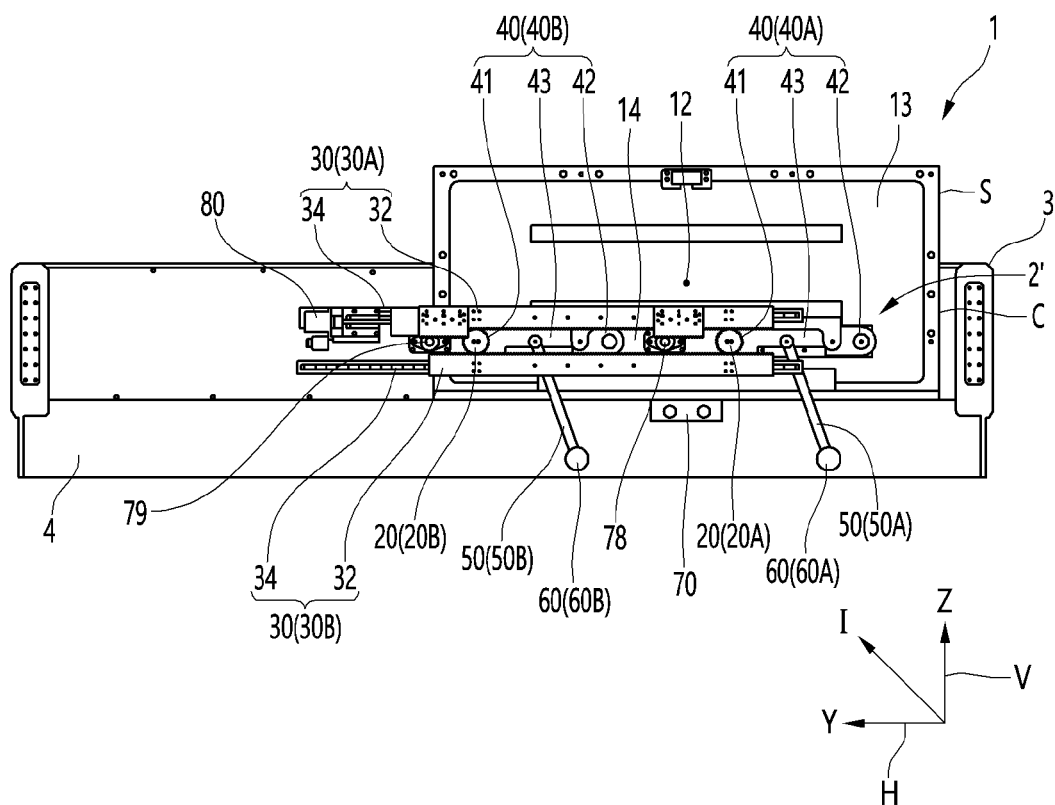

[FIG. 8]
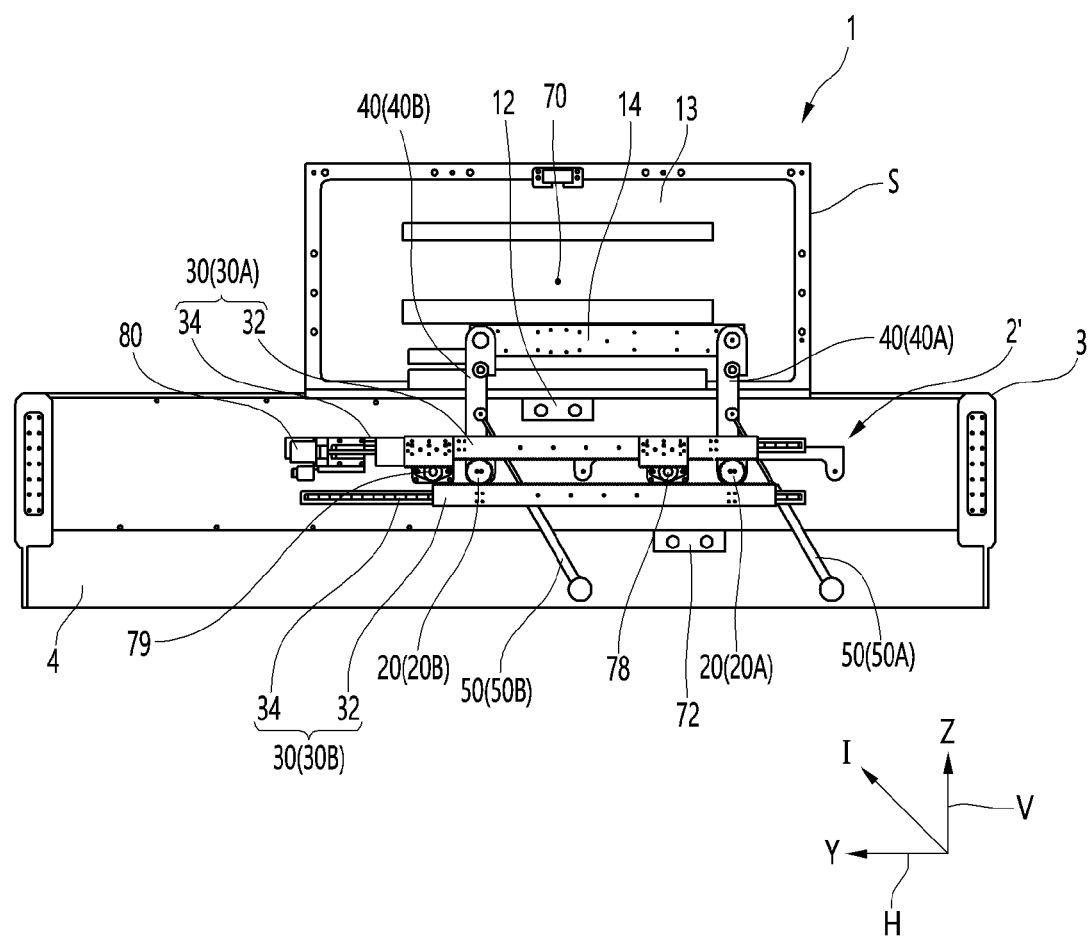

[FIG. 9]
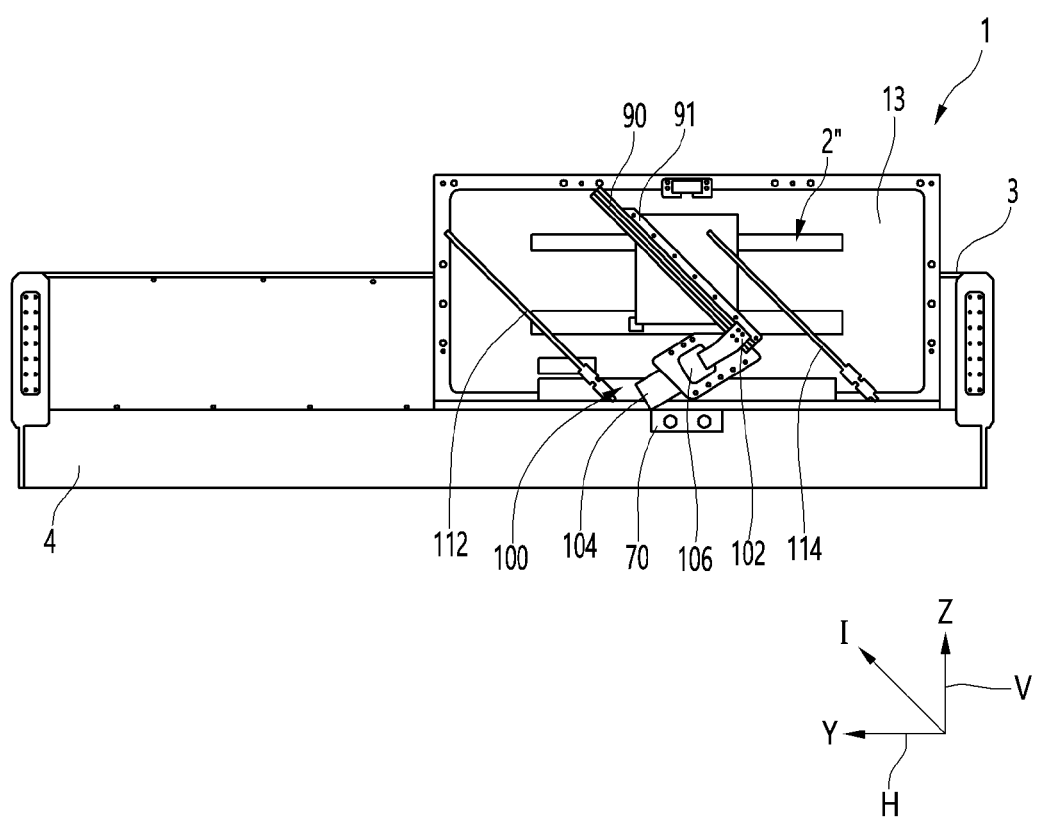

[FIG. 10]
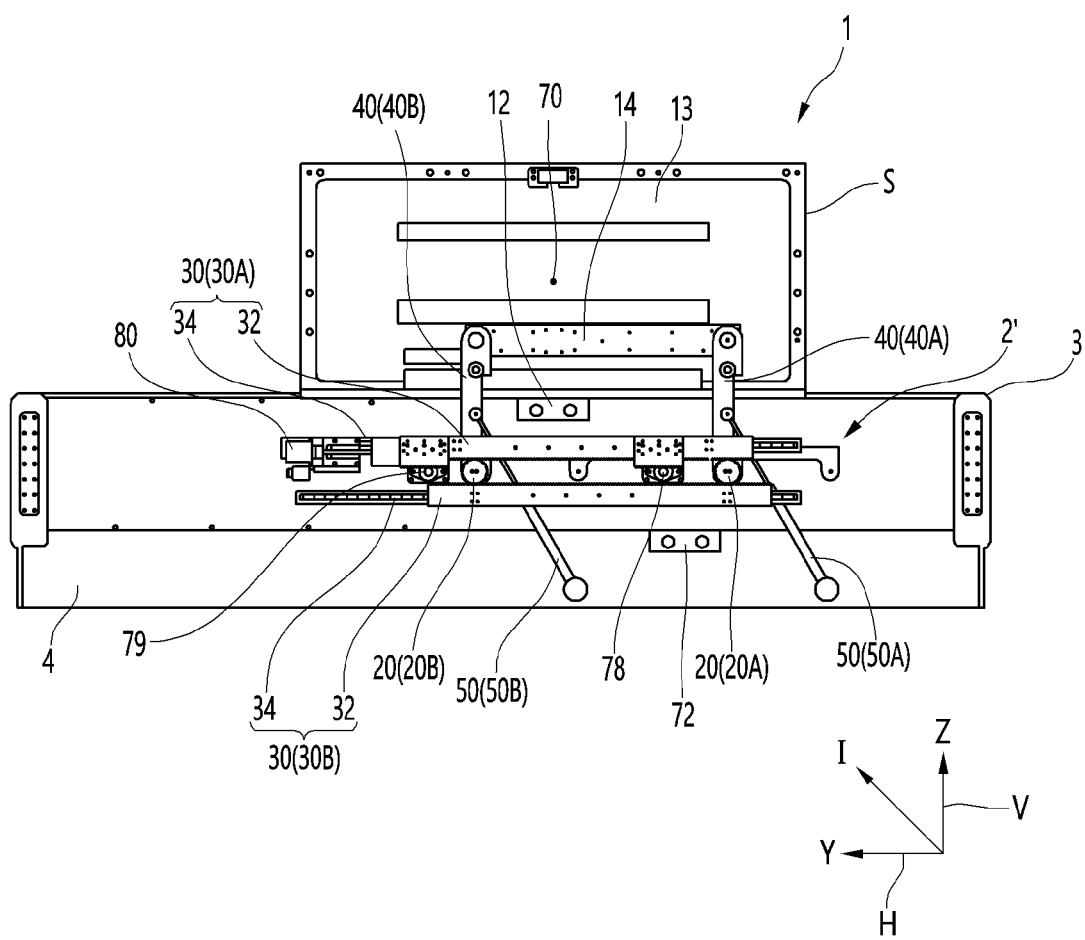

DISPLAY DEVICE

CROSS-REFERENCE TO RELATED APPLICATION(S)

This application is the National Stage filing under 35 U.S.C. 371 of International Application No. PCT/KR2022/020401, filed on Dec. 15, 2022, which claims the benefit of earlier filing date and right of priority to Korean Application No. 10-2022-0111706, filed on Sep. 2, 2022, the contents of which are all incorporated by reference herein in their entirety.

TECHNICAL FIELD

The present invention relates to a display device.

BACKGROUND ART

There is a trend in vehicle being equipped with various sensors and electronic devices for user convenience.

A display device may be installed in a vehicle for the user's driving convenience, and recently, research on a display device installed in a vehicle has been actively conducted.

An example of a display device installed in a vehicle may be a display device disclosed in Korea Patent Publication No. 10-1887078 B1 (announced on Sep. 10, 2018), which comprises: a combiner assembly comprising a combiner 210 that is exposed to the outside of a dashboard or hidden inside the dashboard through a slot defined in the dashboard; a driving unit that provides driving force to the combiner assembly; and a slot opening/closing device that opens and closes the slot by the driving force of the driving unit, and the slot opening/closing device comprises a door that opens and closes the slot.

DISCLOSURE OF THE INVENTION

Technical Problem

The present embodiment provides a display device of which a screen ratio is capable of being changed through a simple structure.

The present embodiment provides a display device in which switching between a small screen mode and a large screen mode is easy.

Technical Solution

A display device according to the present embodiment may comprise: a display module having a hidden area covered by a cover installed on a vehicle and an exposed area above the hidden area; and a guide mechanism connected to the display module and configured to guide movement of the display module in an inclined direction.

The guide mechanism may comprise: a rotary gear; a linear guide configured to guide the rotary gear; a rotation link connected to the rotary gear and the display module; and an elastic member connected to the rotation link and stretched in length.

The linear guide may comprise: an upper linear guide above the rotary gear; and a lower linear guide below the rotary gear.

The upper linear guide and the lower linear guide may be parallel to each other.

The rotary gear may comprise: a left rotary gear; and a right rotary gear disposed to be spaced apart from the left rotary gear in a left and right direction.

The rotation link may comprise: a left rotation link connected to the left rotary gear; and a right rotation link spaced apart from the left rotation link in the left and right direction and connected to the right rotary gear.

The display module may further comprise a base plate, to which the left rotation link and the right rotation link are connected, and which is long in the left and right direction.

The elastic member may comprise: a left spring connected to the left rotation rink; and a right spring spaced apart from the left spring in the left and right direction and connected to the right rotation link.

The display device may further comprise an elastic member connector to which the elastic member is connected.

The guide mechanism may further comprise a motor configured to advance and retreat the linear guide in the left and right direction.

The guide mechanism may comprise: a rack disposed to be elongated in the inclined direction; and a motor module installed in the display module, wherein the motor module may comprise: a pinion configured to move in the inclined direction along the rack; and a motor configured to the pinion to rotate.

The motor may be disposed in the display module.

The display device may further comprise a linear guide that is parallel to the rack and configured to guide the movement of the display module.

The linear guide may be provided in a pair, which are spaced apart from each other, and the rack and the pair of linear guides may be spaced apart from each other in the left and right direction.

The display device may further comprise: a locker disposed on a lower end of the display module; and a lower limit stopper configured to restrict the locker in a downward direction.

Advantageous Effects

According to the present embodiment, the screen ratio may be changed through the simple structure of the guide mechanism for the guidance the display panel in the inclined direction.

In addition, the guide mechanism may change the position and height of the display panel so that the switching between the small screen mode and the large screen mode is easy.

In addition, the various modes may be implemented through the one display module, various UX may be utilized, and the utilization of the display module may be high.

BRIEF DESCRIPTION OF THE DRAWINGS

FIG. 1 is a bottom view illustrating an example of a display device in a small screen mode according to the present embodiment, FIG. 2 is a bottom view illustrating an example of the display device in a large screen mode according to the present embodiment, FIG. 3 is a front view illustrating an example of the display device in the small screen mode according to the present embodiment, FIG. 4 is a front view illustrating an example of the display device in the large screen mode according to the present embodiment, FIG. 5 is a front view illustrating the inside of an example of the display device in the small screen mode according to the present embodiment, FIG. 6 is a front view illustrating the inside of an example of the display device in the large screen mode according to the present embodiment, FIG. 7 is a front view illustrating the inside of another example of the display device in the small screen mode according to the present embodiment, FIG. 8 is a front view illustrating the inside of another example of the display device in the large screen mode according to the present embodiment, FIG. 9 is a front view illustrating the inside of further the other example of the display device in the small screen mode according to the present embodiment, and FIG. 10 is a front view illustrating the inside of further the other example of the display device in the large screen mode according to the present embodiment.

MODE FOR CARRYING OUT THE INVENTION

Hereinafter, detailed embodiments will be described in detail with reference to the accompanying drawings.

FIG. 1 is a bottom view illustrating an example of a display device in a small screen mode according to the present embodiment, FIG. 2 is a bottom view illustrating an example of the display device in a large screen mode according to the present embodiment, FIG. 3 is a front view illustrating an example of the display device in the small screen mode according to the present embodiment, FIG. 4 is a front view illustrating an example of the display device in the large screen mode according to the present embodiment, FIG. 5 is a front view illustrating the inside of an example of the display device in the small screen mode according to the present embodiment, and FIG. 6 is a front view illustrating the inside of an example of the display device in the large screen mode according to the present embodiment.

As illustrated in FIGS. 1 to 6, an example of a display device may comprise a display module 1 and a guide mechanism 2 that guides movement of the display module 1.

The display module 1 may display an image such as video on a rear surface 11. The rear surface 11 of the display module 1 may be a display surface.

The display module 1 may move on an instrument panel 3 (or dashboard) of a vehicle, as illustrated in FIGS. 1 and 2.

The display module 1 may comprise an area S (exposed area) that is visible from a vehicle interior. The display module 1 may comprise an area C (hidden area) that is hidden in the instrument panel 3.

The display module 1 may move so that a size (i.e., surface area) of the exposed area S is variable.

The display module 1 may move so that a size of the hidden area C is variable.

The hidden area C may be an area that is hidden by a cover 4 (see FIGS. 5 and 6) installed on the vehicle.

The cover 4 may constitute a portion of the instrument panel 3 (see FIGS. 1 and 2).

The hidden area C may be disposed in front of the cover 4. The hidden area C may be an area facing the cover 4 at a front side of the cover 4. The hidden area C may be defined as an area on the rear surface 11 of the display module 1 that faces the cover 4 in a front and rear direction.

The exposed area S may be an area disposed above the hidden area C. The exposed area S may be an area that is not covered by the cover 4. The exposed area S may be defined as an area of the rear surface 11 of the display module 1, which does not face the cover 4 in the front and rear direction.

When the display device is in a large screen mode, the size of the exposed area S (see FIG. 2) may be greater than the size of the exposed area S (see FIG. 1) when the display device is in a small screen mode.

When the display device is in the small screen mode, the size of the hidden area C may be more than 50% of the total area of the rear surface 11 of the display module 1. When the display device is in the small screen mode, the size of the exposed area S may be less than 50% of the total area of the rear surface 11 of the display module 1.

When the display device is in the large screen mode, the size of the hidden area C may be 10% or less of the total area of the rear surface 11 of the display module 1. When the display device is in the large screen mode, the size of the exposed area S may be 90% or more of the total area of the rear surface of the display module. When the display device is in the large screen mode, the entire rear surface 11 of the display module 1 may be exposed, the entire rear surface of the display module 1 may be an exposed area S, and the hidden area C may not exist in the display module 1.

The small screen mode may be a mode when the display device provides a long wide screen in the left and right direction and may be a driving mode.

An example of the small screen mode may be applied when a driver drives the vehicle. An example of the small surface mode may be applied when the vehicle is driven in autonomous driving mode.

In the small screen mode, the display module 1 may be in a control and safety mode that displays whether the vehicle is safe and its boundary and may provide a large screen 360° panoramic view.

In the small screen mode, the display module 1 may display a navigation mode, an ADAS/AR view, vehicle information, etc.

In the small screen mode, the display module 1 may provide a relatively smaller screen than the large screen to improve intuitiveness and visibility.

The large screen mode may be a parking mode that is capable of providing a wide screen at a 21:9 ratio and may be a mode in which the display device is used as an entertainment device, and the display module 1 may be used like a monitor.

In the large screen mode, the display module 1 may provide a mobile screen like a mobile terminal. In the large screen mode, the display module 1 may provide a smart device mirroring screen that mirrors the mobile terminal. In the large screen mode, the display module 1 may provide a game screen. In the large screen mode, the display module 1 may provide a video conference screen. In the large screen mode, the display module 1 may provide a net book or dual monitor screen.

The guide mechanism 2 may guide the display module 1 to allow the exposed area S of the display module 1 to increase or decrease, and a screen ratio of the exposed area S may be changed depending on the position of the display module 1.

The guide mechanism 2 may be connected to the display module 1 to guide movement of the display module 1.

The guide mechanism 2 may guide the movement of the display module 1 in an inclined direction I. The inclined direction I may be defined as a direction between a vertical line V and a horizontal line H.

An example of the inclined direction I may be a direction inclined at an angle of 45°.

The display module 1 may ascend and move in the inclined direction of an upper right side direction, as illustrated in FIG. 2, by the guide mechanism 2 and may descend and move in the inclined direction of a lower left side direction, as illustrated in FIG. 1.

The display module 1 may have a rectangular shape of which a width is longer than a length, and the guide mechanism 2 may guide the display module 1 in the inclined direction I so that a position and height of an exact center 12 of the display module 1 are variable.

The instrument panel 3 may further comprise a mounter 5 as illustrated in FIGS. 3 and 4.

The guide mechanism 2 may be mounted on the mounter 5, and the mounter 5 may guide the guide mechanism 2.

The mounter 5 may cover the cover 4 at the front side of the cover 4. An accommodation space in which the guide mechanism 2 is accommodated may be defined between the mounter 5 and the cover 4, and the guide mechanism 2 may be protected by the cover 4 and the mounter 5.

When the mounter 5 is a front cover (or front housing), the cover 4 may be a rear cover (or rear housing).

Hereinafter, the guide mechanism 2 will be described in detail.

The guide mechanism 2 may comprise a rotary gear 20, a linear guide 30, a rotation link 40, and an elastic member 50 as illustrated in FIGS. 5 and 6.

The rotary gear 20 may be disposed in front of the cover 4. The rotary gear 20 may be disposed behind the mounter 5.

The rotary gear 20 may be rotatably disposed on at least one of the cover 4 or the mounter 5. A central axis of the rotary gear 20 may be supported by at least one of the cover 4 or the mounter 5.

A gear may be formed on an outer circumference of the rotary gear 20.

The rotary gear 20 may be provided in plurality and may comprise a left rotary gear 20A and a right rotary gear 20B.

The left rotary gear 20A and the right rotary gear 20B may be disposed to be spaced apart from each other in a left and right direction Y.

Hereinafter, for convenience of explanation, a common configuration and operation of the left rotary gear 20A and the right rotary gear 20B will be described by referring to as the rotary gear 20.

The linear guide 30 may be disposed to guide the rotary gear 20. The linear guide 30 may guide rotation of the rotary gear 20 at an upper or lower side of the rotary gear 20.

The linear guide 30 may comprise a rack 32 engaged with the rotary gear 20, and the rotary gear 20 may be a pinion gear engaged with the rack 32.

The linear guide 30 may further comprise a guide member 34 that guides linear movement of the rack 32. The guide member may be fixed to at least one of the cover 4 or the mounter 5. The guide member 34 may be disposed to be elongated in the left and right direction Y.

The rack 32 may be guided to be slid in the left and right direction Y along the guide member when the rotary gear 20 rotates.

The rack 32 may restrict rapid rotation of the rotary gear 20 when the rotary gear 20 rotates and may allow the rotary gear 20 to rotate at a gentle speed.

The linear guide 30 may be provided in plurality. The linear guide 30 may comprise an upper linear guide 30A at an upper side of the rotary gear 20 and a lower linear guide 30B at a lower side of the rotary gear 20.

The upper linear guide 30A and the lower linear guide 30A may be spaced apart from each other in the vertical direction Z, and the upper linear guide 30A and the lower linear guide 30A may be disposed side by side.

The rack 32 of the upper linear guide 30A may have a gear engaged with the rotary gear 20 disposed on a bottom surface thereof.

The rack 32 of the lower linear guide 30B may have a gear engaged with the rotary gear 20 disposed on a top surface thereof.

Hereinafter, for convenience of explanation, a common configuration and operation of the upper linear guide 30A and the lower linear guide 30A will be described by referring to as the linear guide 30.

The rotation link 40 may be connected to the rotary gear 20 and the display module 1.

The rotation link 40 may comprise a rotation center 41 connected to the central axis of the rotary gear 20 and a connection portion 42 connected to the display module 1.

The connection portion 42 may be spaced apart from the rotation center 41 and the rotation link 40 in a longitudinal direction. When the rotation center 41 is one end of the rotation link 40, the connection portion 42 may be the other end of the rotation link 40.

The connection portion 42 may be rotatably connected to a base plate 14, which will be described later.

The rotation link 40 may further comprise a link portion 43 connecting the rotation center 41 to the connection portion 42.

When the rotary gear 20 rotates in a clockwise or counterclockwise direction, the rotation link 40 may rotate around the rotation center 41 as illustrated in FIG. 5 and then lie down.

When the rotary gear 20 rotates in the clockwise or counterclockwise direction, the rotation link 40 may rotate to be erected around the rotation center 41, as illustrated in FIG. 6.

The rotation link 40 may be provided in plurality, and the rotation links 40 may comprise a left rotation link 40A and a right rotation link 40B.

The left rotation link 40A may be connected to the left rotary gear 20A. The rotation center 41 of the left rotation link 40A may be connected to the central axis of the left rotary gear 20A. When the left rotary gear 20A rotates, the left rotation link 40A may rotate in the clockwise or counterclockwise direction together with the left rotary gear 20A.

The right rotation link 40B may be spaced apart from the left rotation link 40A in the left and right direction Y.

The right rotation link 40B may be connected to the right rotary gear 20B. The rotation center 41 of the right rotation link 40B may be connected to the central axis of the right rotary gear 20B. When the right rotary gear 20B rotates, the right rotation link 40B may rotate in the clockwise or counterclockwise direction together with the right rotary gear 20B.

The elastic member 50 may be connected to the rotation link 40. A length of the elastic member 50 may extend.

An example of the elastic member 50 may be a coil spring of which a length extends along the rotary link 40 and may be, for example, a compression spring or a tension spring.

The guide mechanism 2 may further comprise an elastic member connector 60 to which the elastic member 50 is connected.

The elastic member 50 may be rotatably connected to the elastic member connector 60.

One end of the elastic member 50 may be connected to the elastic member connector 60, and the other end of the elastic member 50 may be connected to the link portion 43 of the rotary link 40.

The elastic member connector 60 may comprise a left elastic member connector 60A and a right elastic member connector 60B, which are spaced apart from each other in the left and right direction Y.

Hereinafter, for convenience of explanation, a common configuration and operation of the left elastic member connector 60A and the right elastic member connector 60B will be described by referring to as the elastic member connector 60.

The elastic member connector 60 may be mounted on at least one of the cover 4 or the mounter 5.

As illustrated in FIG. 5, the elastic member 50 may be disposed at an angle of approximately 60° to 80° and may be disposed at a position and angle at which repulsive force is advantageous.

The elastic member 50 may be provided in plurality. The elastic member 50 may comprise a left spring 50A and a right spring 50B.

The left spring 50A may be connected to the left rotation link 40A. One end of the left spring 50A may be connected to the left elastic member connector 60A, and the other end may be connected to the link portion 43 of the left rotation link 40A.

The right spring 50B may be connected to the right rotation link 40B. One end of the right spring 50B may be connected to the right elastic member connector 60B, and the other end may be connected to the link portion 43 of the right rotation link 40B.

The right spring 50B may be spaced apart from the left spring 50A in the left and right direction Y.

Hereinafter, for convenience of explanation, a common configuration and operation of the left spring 50A and the right spring 50B will be described by referring to as the elastic member 50.

The display module 1 may further comprise a base plate 14 as illustrated in FIGS. 5 and 6.

The base plate 14 may be disposed on the front surface 13 of the display module 1.

The base plate 14 may be disposed to be elongated in the left and right direction Y on the front surface 13 of the display module 1.

The left rotation link 40A and the right rotation link 40B may be connected to the base plate 14. The left rotation link 40A and the right rotation link 40B may be connected to the base plate 14 so as to be spaced apart from each other in the left and right direction Y.

The left end of the base plate 14 may be rotatably connected to the connection portion 42 of the left rotation link 40A.

A right end of the base plate 14 may be rotatably connected to the connection portion 42 of the right rotation link 40B.

The left rotary gear 20A, the left rotation link 40A, the base plate 14, the right rotation link 40B, and the right rotary gear 20B may function as a three-link.

The guide mechanism 2 may further comprise a locker 70 disposed at a lower end of the display module 1, and a lower limit stopper 72 that is restricted in a downward direction.

A protrusion may be disposed on one of the locker 70 and the lower limit stopper 72, and a groove into which the protrusion is inserted to be hooked may be defined in the other one of the locker 70 and the lower limit stopper 72.

When the display module 1 is in the lower limit position, the locker 70 may face the lower limit stopper 72 in the front-to-rear direction, the protrusion may be inserted into the groove to be hooked, the locker 70 may be restricted by the lower limit stopper 72, and arbitrary movement of the display module 1 may be restricted.

When the locker 70 is locked to the lower limit stopper 72, the display module 1 may be in the small screen mode and be maintained in the small screen mode as illustrated in FIG. 1.

When the locker 70 is restricted by the lower limit stopper 72, and a user pushes the display module 1 laterally with a finger F (see FIG. 1), the protrusion of the locker 70 may get out of the groove, and thus, the restriction by the lower limit stopper 72 may be released, and the display module 1 may be movable.

The guide mechanism 2 may further comprise an upper limit stopper (not shown) that restricts the locker 70 in an upward direction.

A protrusion may be disposed on one of the locker 70 and the upper limit stopper, and a groove into which the protrusion is inserted to be hooked may be defined in the other one of the locker 70 and the upper limit stopper.

The upper limit stopper may have the same structure as the lower limit stopper 72, and the upper limit stopper may be spaced apart from the lower limit spotter 72 in the inclined direction I.

When the display module 1 is in the upper limit position, the locker 70 may face the upper limit stopper in the front-to-rear direction, the protrusion may be inserted into the groove to be hooked, the locker 70 may be restricted by the upper limit stopper, and the arbitrary movement of the display module 1 may be restricted.

When the locker 70 is locked to the upper limit stopper, the display module 1 may be in the large screen mode and be maintained in the large screen mode as illustrated in FIG. 2.

When the locker 70 is restricted by the upper limit stopper, and a user pushes the display module 1 laterally with a finger F (see FIG. 1), the protrusion of the locker 70 may get out of the groove, and thus, the restriction by the upper limit stopper may be released, and the display module 1 may be movable.

The locker 70 is not limited to being locked by physical locking of the protrusion and the groove on the lower limit stopper 72 or the upper limit stopper and also may be locked with an electromagnet. As an example, an electromagnet may be installed in the locker 70, and a magnetic material may be installed in the lower limit stopper 72 and the upper limit stopper. In another example, a magnetic material may be installed in the locker 70, and an electromagnet may be installed in the lower limit stopper 72 and the upper limit stopper.

The guide mechanism 2 may comprise dampers 78 and 79 that are capable of absorbing impact energy and performing a position control when the display module 1 moves.

The dampers 78 and 79 may be provided in plurality and may comprise a left damper 78 and a right damper 79.

The left damper 78 and the right damper 79 may be spaced apart from each other in the left and right directions Y.

Hereinafter, for convenience of explanation, a common configuration and operation of the left damper 78 and the right damper 79 will be described by referring to as dampers 78 and 79.

Examples of the dampers 78 and 79 may be a spring damper comprising a spring connected to the rack 32, or a gear damper comprising a gear engaged with the rack 32.

When the dampers 78 and 79 are gear dampers, the gear damper may comprise a gear engaged with the rack 32 of either the upper linear guide 30A or the lower linear guide 30B.

The dampers 78 and 79 may be mounted on at least one of the cover 4 or the mounter 5.

FIG. 7 is a front view illustrating the inside of another example of the display device in the small screen mode according to the present embodiment, and FIG. 8 is a front view illustrating the inside of another example of the display device in the large screen mode according to the present embodiment.

A guide mechanism 2' may comprise a motor 80 that advances and retreats the linear guide 30 in the left and right direction.

Another example of the display device may have the same or similar configuration and operation other than the motor 80 as the example of the display device, and in order to avoid duplicate description, the same symbols are used, and detailed description thereof is omitted.

One example of the display device may move the display module 1 in a manual mode, and another example of the display device may move the display module 10 in an automatic mode.

The motor 80 may be connected to either the upper linear guide 30A or the lower linear guide 30B.

The motor 80 may be mounted on at least one of the cover 4 or the mounter 5, and in a fixed position, the motor 80 may advance or retreat any one rack 32 of the upper linear guide 30A and the lower linear guide 30B in the rack 32.

Examples of the motor 80 may be a lead motor or a linear motor and may comprise a shaft connected to the rack 32 to advance and retreat the rack 32 in the left and right direction Y.

The motor 80 may be controlled by a microcomputer installed in the vehicle or a microcomputer of the display device.

The microcomputer may apply a pull signal or a push signal to the motor 80.

When the pull signal is applied to the motor 80, the motor 80 may pull the rack 32, the rack 32 may allow the rotary gear 20 to rotate, the rotation link 30 may be erected by stretching the elastic member 50, the display module 1 may move to the large screen mode as illustrated in FIG. 8, and when the locker 70 is restricted by the upper limit stopper, the display module 1 may be maintained in the large screen mode.

When the push signal is applied to the motor 80, the motor 80 may push the rack 32, the rack 32 may allow the rotary gear 20 to reversely rotate, the rotation link 30 may be laid down while compressing the elastic member 50, the display module 1 may move to the small screen mode, as illustrated in FIG. 7, and when the locker 70 is restricted by the lower limit stopper 72, the display module 1 may be maintained in the small screen mode.

FIG. 9 is a front view illustrating the inside of further the other example of the display device in the small screen mode according to the present embodiment, and FIG. 10 is a front view illustrating the inside of further the other example of the display device in the large screen mode according to the present embodiment.

A guide mechanism 2" may comprise a rack 90 disposed to be elongated in the inclined direction I and a motor module 100 installed on the display module 2, and the motor module 100 may comprise a pinion 102 that moves in the inclined direction I along the rack 90 and a motor 104 that allows the pinion 102 to rotate.

The other example of the display device may have the same or similar configuration and operation other than the guide mechanism 2" as the example of the display device, and in order to avoid duplicate description, the same symbols are used, and detailed description thereof is omitted.

The rack 90 may guide the pinion 102 in a fixed position. The rack 90 may be disposed on the rack guide 91. At least one of the rack 90 or the rack guide 91 may be mounted on at least one of the cover 4 or the mounter 5.

The pinion 102 may move along the rack 90 in a longitudinal direction of the rack 90.

The motor 104 may be installed in the display module 1 to move together with the display module 1.

One example of the motor 104 may have a rotation shaft that is directly connected to a central axis of the pinion 102. Another example of the motor 104 may be a power transmission member such as an intermediate gear connected to the pinion 102, and the rotation shaft may allow the power transmission member to rotate so that the pinion 102 rotates.

The motor module 100 may further comprise a damper 106 disposed between the motor 104 and the pinion 102.

The damper 106 may absorb impact energy and perform a position control when the display module 1 moves.

An example of the damper 106 may be a spring damper comprising a spring connected to the rotation shaft of the motor 104 or the pinion 102 or may be a gear damper comprising a gear engaged with the power transmission member.

The guide mechanism 2" may further comprise linear guides 112 and 114 that are parallel to the rack 90 and guide the movement of the display module 1.

The linear guides 112 and 114 may be disposed fixedly on at least one of the cover 4 or the mounter 5.

Each of the linear guides 112 and 114 may be disposed at the same angle (e.g., 40° to 50°) as the rack 90.

A protrusion (not shown) guided in a longitudinal direction of the linear guides 112 and 114 may be disposed on the front surface 13 of the display module 1.

The linear guides 112 and 114 may be provided in plurality. A pair of linear guides 112 and 113 may be disposed to be spaced apart from each other.

The rack 90 and the pair of linear guides 112 and 114 may be spaced apart from each other in the left and right direction Y.

The locker 70 may be disposed at the lower end of the display module 1 as in an example of the display device, and the lower limit stopper 72 and the upper limit stopper may be disposed on at least one of the cover 4 or the mounter 5.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being comprised in the present invention.

The invention claimed is:

1. A display device comprising: a display module having a hidden area covered by a cover installed on a vehicle and an exposed area above the hidden area; and a guide mechanism connected to the display module and configured to guide movement of the display module in an inclined direction, wherein the guide mechanism comprises: a rotary gear; a linear guide configured to guide the rotary gear: a rotation link connected to the rotary gear and the display module; and an elastic member connected to the rotation link and stretched in length, wherein the linear guide comprises: an upper linear guide above the rotary gear; and a lower linear guide below the rotary gear, wherein the upper linear guide and the lower linear guide are parallel to each other.

2. The display device according to claim 1, wherein the linear guide comprises:
   an upper linear guide above the rotary gear; and
   a lower linear guide below the rotary gear,
   wherein the upper linear guide and the lower linear guide are parallel to each other.

3. The display device according to claim 1, wherein the rotary gear comprises:
   a left rotary gear; and
   a right rotary gear disposed to be spaced apart from the left rotary gear in a left and right direction.

4. The display device according to claim 3, wherein the rotation link comprises:
   a left rotation link connected to the left rotary gear; and
   a right rotation link spaced apart from the left rotation link in the left and right direction and connected to the right rotary gear.

5. The display device according to claim 4, wherein the display module further comprises a base plate, to which the left rotation link and the right rotation link are connected, and which is long in the left and right direction.

6. The display device according to claim 4, wherein the elastic member comprises:
   a left spring connected to the left rotation rink; and
   a right spring spaced apart from the left spring in the left and right direction and connected to the right rotation link.

7. The display device according to claim 1, further comprising an elastic member connector to which the elastic member is connected.

8. The display device according to claim 1, further comprising:
   a locker disposed on a lower end of the display module; and
   a lower limit stopper configured to restrict the locker in a downward direction.

9. The display device according to claim 1, further comprising a motor configured to advance and retreat the linear guide in the left and right direction.

\* \* \* \* \*